United States Patent [19]

Mashimo et al.

[11] Patent Number: 5,278,815
[45] Date of Patent: Jan. 11, 1994

[54] DIGITAL DATA REPRODUCING APPARATUS

[75] Inventors: Akira Mashimo; Mitsumasa Kubo; Fumio Hishiyama, all of Musashino; Masayoshi Shimamoto; Teruo Furukawa, both of Amagasaki, all of Japan

[73] Assignees: Teac Corporation; Mitsubishi Denki Kabushiki Kaisha, Tokyo, Japan

[21] Appl. No.: 765,129

[22] Filed: Sep. 25, 1991

[30] Foreign Application Priority Data

Sep. 26, 1990 [JP] Japan .................. 2-259346

[51] Int. Cl.$^5$ .............................. G11B 5/09
[52] U.S. Cl. .......................... 369/48; 360/48; 360/51; 369/44.32; 369/59; 369/124
[58] Field of Search ............ 360/48, 51; 369/44.32, 369/44.26, 44.28, 44.29, 44.35, 59, 48, 124

[56] References Cited

FOREIGN PATENT DOCUMENTS 1303630 5/1988 Japan .
0200305 8/1988 Japan .................. 360/51
2306475 5/1989 Japan .

Primary Examiner—Robert J. Pascal
Assistant Examiner—Arnold M. Kinkead
Attorney, Agent, or Firm—Wolf, Greenfield & Sacks

[57] ABSTRACT

This digital data reproducing apparatus is adapted to prevent reproduction errors of data, wherein a read gate opened when a fixed pattern in a header field for phase locking is detected is kept opened until the data reproduction in a data field is completed, whereby the phase locking in the data field is performed still in the same low-speed mode as when the PLL pull-in is completed in the header field, with the responding ability lowered to defects such as voids or the like in the phase locking pattern area in the data field.

This digital data reproducing apparatus is adapted to prevent reproduction errors, wherein, when a reproduced data in a data field is locked, a read gate is opened after a fixed pattern recorded for phase locking is surely detected, so that the phase locking is started in a high-speed mode, while avoiding erroneous operations of the PLL.

13 Claims, 14 Drawing Sheets

DIGITAL DATA REPRODUCING APPARATUS

BACKGROUND OF THE INVENTION

1. Field of the Invention

This invention generally relates to an apparatus for reproducing digital data from an optical disk having a pre-formatted header field and a data field for recording data, and more particularly, to a technique to improve the reproducing efficiency of the data field.

2. Description of Related Art

A recording format of an optical disk is regulated by ISO. FIG. 1 shows a format of one sector in an optical disk of continuous servo type regulated in accordance with the ISO standard. One sector has 746 bytes, the first 52 bytes being a pre-formatted leader field HD (hereinafter, byte will be abbreviated as B). Following the header field HD, there are formatted an ODF field of 1B without guide grooves, a flag field FLAG of 5B indicating whether or not the information is recorded in the subject sector and an ALPC field of 2B for trial recording. A GAP field having 3B is present both in front of and in the rear of the FLAG field. A data field DT of 665B is formatted succeeding the ALPC field.

The format of the 52B header field IID will be depicted. The first 5B is a sector mark SM indicative of the head of the sector. Subsequent to the sector mark SM are sequentially formatted a 12B fixed pattern $VFO_1$ for pulling in by a PLL, a 1B address mark AM indicating that an address information ID is following, and the address information ID such as a track number, a sector number or the like and an error detection code CRC to indicate an error of the ID information. The ID information and CRC code are 5B in total. Thereafter, two units of 8B fixed pattern $VFO_2$, a 1B address mark AM, a 5B address information ID and error detection code CRC are successively formatted. A postamble PA is recorded 1B at the end of the header field HD. This postamble PA is provided to record several bits overflowing without being modulated when the data is modulated according to the (2,7) modulation rule. Therefore, without the postamble PA, the last 1B may possibly be unable to be modulated.

A 12B fixed pattern $VFO_3$ is formatted at the head of the data field DT, followed by a 3B sync pattern SYNC and a 650B data area including user data DATA. A 15B BUFFER is provided subsequent to the data area as a margin in order to prevent the header field of a next sector from incorrectly being recorded to, due to deviations in the starting point of recording of the data field or a change in a rotation system.

The fixed patterns $VFO_1$, $VFO_2$ and $VFO_3$ are respectively 12B, 8B and 12B, which are recorded by repetitions of "100" patterns since recording is arranged by a (2,7) modulation code in the whole area except for the sector mark SM, and it is the "100" pattern that generates "1" most frequently by the (2,7) modulation code.

FIG. 2 is a structural block diagram of a conventional digital data reproducing apparatus for reproducing data from an optical disk formatted according to the ISO standard of FIG. 1.

In FIG. 2, disk reproduction data DRD from an optical disk (not shown) is fed to an RG generation circuit 1 which generates a read gate signal RG to determine the reproduction term, and also to a PLL circuit 2 which synchronizes the phases of the DRD and a reproduction clock VCOCK when the read gate generation circuit is open. The phase of a reference clock 2FCK inputted to the PLL circuit 2 is synchronized with the reproduction clock VCOCK when the read gate generation circuit is closed. The reference clock 2FCK is supplied to the RG generation circuit 1, an HDG generation circuit 8 and a lock decision circuit 5 as well. A data read control signal DRC from a microcomputer 7 which will be described later, a data demodulation completion signal DMC from a data demodulation circuit 4, and an address detection completion signal ADC from an address detection circuit 3 are also inputted to the RG generation circuit 1. The RG generation circuit 1 generates the read gate signal RG based on the above-mentioned five input signals. Moreover, a header/data gate signal HDG is given from the HDG generation circuit 8 to the RG generation circuit 1, so that the fixed pattern VFO when the PLL operation is pulled into is distinguished. The header/data gate signal HDG becomes "1" in the header field HD and "0" in the data field DT. Meanwhile, the read gate signal RG is outputted such that it is always "1" in the header field, opening the read gate, whereas it becomes "1" at the reproduction time in the data field DT, thereby opening the read gate. The outputted read gate signal RG is sent to the PLL circuit 2, controlling the timing when the PLL operation is started or stopped. A high/low speed control signal HLC is fed to the PLL circuit 2 from the lock decision circuit 5, and therefore, the pull-in of the PLL operation up to the completion of locking can be switched between high or low speed by the PLL circuit 2. The PLL circuit 2 generates a sync data SD and the reproduction clock VCOCK to the address detection circuit 3, a data demodulation circuit 4 and the lock decision circuit 5.

The address detection circuit 3 detects the address information ID of the header field HD of the optical disk from the sync data SD, with outputting the address detection completion signal ADC. The data demodulation circuit 4 performs (2,7) demodulation on the sync data SD during the timing of the reproduction clock (according to the (2,7) demodulation rule) and outputs the demodulated data to the error correction circuit 6. When the data within one sector is demodulated, the data demodulation circuit also generates and outputs the data demodulation completion signal DMC. The lock decision circuit 5 detects whether or not the PLL circuit 2 locks from the phase difference between the sync data SD of the fixed pattern VFO stored in the header field HD and data field DT and, the reproduction clock VCOCK. When the PLL circuit 2 is in the unlocking state, the circuit 5 generates the high/low speed control signal HLC "0" to the circuit 2, or if the PLL circuit 2 is in the locking state, the circuit 5 generates the high/low speed control signal "1" to the circuit 2. The lock decision circuit 5 has a counter to be used when the PLL circuit 2 is unable to lock the reproduction clock VCOCK to the disk reproduction data DRD. This counter counts the number of reference clocks 2FCK. In the above case where the PLL circuit 2 is unable to lock the reproduction clock VCOCK, when the counter counts a preset number of clocks, the high/low speed control signal HLC of "1" is outputted. The error correction circuit 6 detects an error of the demodulated data, corrects the data with use of an error correction code according to a predetermined operation and then, outputs a reproduction data RD after the correction. At the same time if the correction is impossible, an error correction nullified detection signal ECN indicating the fact is outputted from the error correction circuit 6 to the microcomputer 7. In the case of the optical disk formatted as indicated in FIG. 1, the error correction circuit 6 can correct 8B at the maximum in the coding direction and can correct up to 40B continuously. The microcomputer 7, when receiving the error correction nullified detection signal ECN, outputs the data read control signal DRC to the RG generation circuit 1.

A counter is provided inside the HDG generation circuit 8. When the HDG generation circuit 8 receives the address detection completion signal ADC and reference clock 2FCK, it changes the header/data gate HDG from "1" to "0" at the inputting timing of the address detection completion signal ADC. Upon completion of counting of a predetermined number of clocks at the timing related to the rear end of the data field DT, the circuit 8 changes the header/data gate HDG from "0" to "1". The header field HD is distinguished from the data field DT by the header/data gate HDG.

FIG. 3 is a structural block diagram of the conventional RG generation circuit 1.

The disk reproduction data DRD is applied to a sector mark detection circuit 11 which detects the sector mark SM of the header field HD and to a header field VFO detection circuit 10 which detects fixed patterns $VFO_1$, $VFO_2$ of the header field HD. The reference clock 2FCK is given to the sector mark detection circuit 11, header field VFO detection circuit 10, a first counter 12 and a second counter 13.

The sector mark detection circuit 11 samples the disk reproduction data DRD with the timing when the reference clock 2FCK is outputted, detecting a low frequency pattern with which the sector mark SM is recorded (a pattern having continuous "1"s or "0"s), and outputting the sector mark detection signal SMD to the first counter 12 and a latch output to a selector 14b and the second counter 13 described later.

The first counter 12 determines the timing with which the read gate of the header field HD is opened. When the first counter 12 receives the sector mark detection signal SMD from the sector mark detection circuit 11, the counter starts counting the number of reference clocks 2FCK at that tune point. When the counter 12 finishes counting, it generates a first count completion signal CT1 to a selector 14a. To the header field VFO detection circuit 10 is applied the header/data gate signal HDG. The header field VFO detection circuit 10 samples the disk reproduction data DRD with the inputting timing of the reference clock 2FCK and detects the first fixed pattern $VFO_1$ of the header field HD when the header/data gate signal HDG is "1", with outputting a VFO detection signal VFD to the selector 14a. The selector 14a in turn selects the first count completion signal CT1 or VFO detection signal VFD in accordance with the detecting result of the sector mark SM. In other words, when the sector mark SM is detected, the latch output of the sector mark detection signal SMD is retained "1" until the next sector mark SM is detected, whereby the selector 14a selects the first count completion signal CT1. The selected signal CT1 is sent to a set terminal of a flip-flop 15a. The flip-flop 15a is set with the outputting timing of the signal CT1 thereby turning a read gate signal $RG_1$ to "1" and opening the read gate.

If the sector mark SM is riot detected and the latch output is "0", the selector 14a selects the VFO detection signal VFD, applying the same to the set terminal of the flip-flop 15a. Accordingly, the flip-flop 15a is set with the detecting timing of the signal VFD, turning the read gate signal $RG_1$ to "1" and opening the read gate.

In the meantime, the timing when the read gate is closed, namely, when the flip-flop 15a is reset is the detecting timing of the address detection completion signal ADC. The read gate signal RG1 is turned "0" at this timing, thereby closing the read gate.

The second counter 13 counts the number of reference clocks 2FCK to determine the timing when the read gate of the data field DT is opened. A first and a second numbers of clocks are set by the latch output from the sector mark detection circuit 11. The number of clocks is started to be counted with the timing when the address detection completion signal ADC selected by the selector 14b or the sector mark detection signal SMD is inputted.

The selector 14b selects the sector mark detection signal SMD when receiving the general latch output of "1" from the sector mark detection circuit 11. The second counter 13, upon receipt of the sector mark detection signal SMD, starts to count the number of reference clocks 2FCK. When the first number of clocks is completely counted, a second count completion signal CT2 is outputted to a set terminal of a flip-flop 15b from the second counter 13. When the sector mark SM is riot detected (latch output "0"), the second counter 13 starts counting when it receives the address detection completion signal ADC. After the counter 13 finishes counting of the second number of clocks, it generates the second count completion signal CT2. The flip-flop 15b is set with the inputting timing of the second count completion signal CT2, turning a read gate signal $RG_2$ of the data field DT to "1", with opening the read gate. The flip-flop 15b is reset by the data demodulation completion signal DMC, when the read gate signal $RG_2$ is turned to "0" and the read gate is closed.

The read gate signal $RG_1$ outputted from the flip-flop 15a is applied to one input terminal of an OR gate 17, while the read gate signal $RG_2$ from the flip-flop 15b is given to the other input terminal of the OR gate 17. The output of the OR gate 7 is applied to the PLL circuit 2 as the read gate signal RG. A switch circuit 16 is controlled ON or OFF by the data read control signal DRC from the microcomputer 7. More specifically, the switch circuit 16 is turned ON when the data is read, thereby transmitting the read gate signal $RG_2$.

Fig, 4 is a structural block diagram of the PLL circuit 2. When the optical disk is rotated, for example, at 2400 rpm, the frequency of the reference clock 2FCK is approximately 15 MHz. After the frequency of the reference clock 2FCK is divided by a ⅓ frequency divider 20 to have the waveform of about 5 MHz similar to the fixed pattern VFO of "100", the reference clock is inputted to one input terminal of a selector 21. The disk reproduction data DRD is inputted to the other input terminal of the selector 21. Moreover, the read gate signal RG is applied to a switch terminal of the selector. When the read gate signal RG is "1" and the read gate is opened, the disk reproduction data DRD is selected. An output of the selector 21 is sent to a phase comparator 22, a reference clock generation circuit 26 and a sync data generation circuit 27. In the phase comparator 22, outputs of the selector 21, the reference clock generation circuit 26 and a feedback output based on the reproduction clock VCOCK from a voltage control oscillator (VCO) 25 are compared, so that a difference signal of the pulse width corresponding to the phase difference is outputted to a charge pump 23. The charge pump 23 drives a current during the time of the pulse width of the difference signal, and charges or discharges a loop filter 24. The charge pump 23 is fed with the high/low speed control signal HLC. The control signal HLC is "0" to bring the high speed pull-in mode until the feedback output is locked to the disk reproduction data DRD. The control signal HLC becomes "1" after the feedback output is locked, thereby starting the low speed pull-in mode. In the high speed mode, the output current of the charge pump 23 is increased and a charging (discharging) time constant of the loop filter is made larger than in the low speed mode, thereby improving the control speed of the PLL operation and shortening the time before the output is locked. Accordingly, the reproduction clock VCOCK is pulled and locked in the disk reproduction data DRD at high speeds immediately after the read gate is opened consequent to a large phase difference. After the clock is locked, the responding property is lowered so that the apparatus is not so much sensitive to defects of the medium or jitters of the disk reproduction data DRD, thus avoiding unlooking.

The loop filter 24 converts and smooth the current signal charged or discharged from the charge pump 23 to a voltage signal, and sends the voltage signal to the voltage control oscillator (VCO) 25. The VCO 25 outputs the reproduction clock VCOCK of the frequency corresponding to the inputted voltage signal. The reproduction clock VCOCK becomes gradually synchronized with the disk reproduction data DRD in phase and finally locked.

The reproduction clock VCOCK is outputted to the address detection circuit 3, data demodulation circuit 4 and lock decision circuit 5. At the same time, the reproduction clock VCOCK is sent to the reference clock generation circuit 26 within the PLL circuit 2. When the read gate is closed, or when the read gate is opened and before locking is completed, the frequency of the reproduction clock VCOCK is divided into three in the reference clock generation circuit 26 and fed back to the phase comparator 22. When the read gate is opened and after locking is finished, the reproduction clock VCOCK within the "1" period of the disk reproduction data DRD is gated to be fed back to the phase comparator 22.

The reproduction clock VCOCK is fed also to the sync data generation circuit 27, where the waveform of the disk reproduction data DRD is shaped so that the approximate center of the pulses of the disk reproduction data DRD becomes a rise edge of the reproduction clock VCOCK. Thereafter, the disk reproduction clock VCOCK is outputted as the sync data SD.

The operation of the conventional digital data reproducing apparatus in the above structure will be depicted hereinafter. FIG. 5 is a timing chart of signal waveforms at each part of the RG generation circuit 1 at the data reproduction time. When the sector mark SM is detected, the sector mark detection signal SMD is changed from "1" to "0" for one cycle of the reference clock 2FCK (FIG. 5(a)). In consequence, the first counter 12 starts counting, and outputs the first count completion signal CT1 "0" (FIG. 5(b)). When the first count completion signal CT1 of "0" is outputted, the read gate signal $RG_1$ is changed from "0" to "1" (FIG. 5(f)). As the address detection completion signal ADC showing the rear end of the header field HD is turned to "0" (FIG. 5(c)), the flip-flop 15a is reset, and the read gate signal $RG_1$ becomes "0" from "1", whereby the read gate of the header field HD is closed (FIG. 5(f)). At this time, the header/data gate signal HDG is also changed to "0" from "1" to be closed (FIG. 5(j)). The header/data gate signal HDG is opened a predetermined time later after it is changed to "0".

Subsequently, the flip-flop 15b is set with the timing when the second count completion signal CT2 is outputted from the second counter 13 (FIG. 5(d)), and the read gate signal $RG_2$ of the data field DT is changed from "0" to "1" (FIG. 5(g)). Accordingly, the read gate of the data field is opened until the data demodulation signal DMC of "0" is outputted (FIG. 5(e)). At this time, the switch 16 is turned ON by the data read control signal DRC of "1" from the microcomputer 7 (FIG. 5(i)), and two read gate signals $RG_1$ and $RG_2$ are inputted to the OR gate 17, and the read gate signal RD is outputted to the PLL circuit 2 (FIG. 5(h)).

FIG. 6 is a timing chart when the PLL circuit 2 in the data field DT is driven. A clock 2FCK/3 obtained by dividing the reference signal into three is selected by the selector 21 until the read gate signal RG becomes "1", and fed to the phase comparator 22 (FIG. 6(a)). Therefore, there is no phase difference detected between the clocks 2FCK/3 and VCOCK/3 after being locked. The output CP of the charge pump 23 is "0" and the output LF of the loop filter 24 is a reference value "0". The reference value mentioned above is an output value of the loop filter 24 when the oscillating frequency of the VCO 25 is equal to the frequency of the reference clock 2FCK. The PLL circuit 2 is designed so that the oscillating frequency of the VCO 25 is in the variable range of the frequency of the reference clock 2FCK.

When the read gate signal is turned from "0" to "1" (FIG. 6(d)), the selector 21 selects the disk reproduction data DRD. The phase comparator 22 detects the phase difference of the rise edge between the disk reproduction data DRD and clock VCOCK/3 obtained by dividing the frequency of the reproduction clock VCOCK into three, and outputs the output pulse PC of the pulse width corresponding to the phase difference (FIG. 6(e)). In this case, since the VCOCK/3 advances more in phase than the reproduction data, the charge pump 23 discharges the loop filter 24 by the current signal corresponding to the pulse width of the output pulse PC. The discharging time constant of the charge pump 23 is rendered large at this time because of the high speed pull-in mode. The current signal is converted and smoothed by the loop filter 24 to the voltage signal LF (FIG. 6(f)), and then applied to the VCO 25. The VCO 25 outputs the reproduction clock VCOCK of approximately 15 MHz corresponding to the voltage applied thereto. When the lock decision circuit 5 detects a predetermined number of fixed patterns $VFO_3$ of "100", the circuit judges that the pull-in of the PLL is completed and the reproduction clock VCOCK is locked to the disk reproduction data DRD, outputting the high/low speed control signal HLC "1" to the charge pump 23. As a result, the low speed pull-in mode is started (FIG. 6(i)).

When it enters the low speed mode (locking is completed), the reproduction clock VCOCK is allowed to pass by the disk reproduction data DRD, and the phases of the reproduction clock VCOCK generated when the disk reproduction data is "1" and the disk reproduction data DRD are compared with each other. The charge pump 23 drives the loop filter by the current signal smaller than that in the high speed mode during the time of the pulse width of the pulse signal PC from the phase comparator 22. Accordingly, the responding property to the pulse signal PC from the phase comparator 22 is deteriorated.

In the conventional digital data reproducing apparatus of the above-described structure, when a part of the fixed pattern $VFO_3$ for the pull-in of the PLL cannot be detected before the PLL circuit 2 completely locks the reproduction data, that is, in the high-speed pull-in mode due to the adhesion of foreign substances such as dusts or the like onto the fixed pattern $VFO_3$ resulting in the loss of the reproduction data, all the reproduction outputs are turned "0", and therefore the phase comparator 22 outputs the pulse signal PC for driving the charge pump 23 and having the pulse width to turn the output to "1" until the rise edge of "1" of the fixed pattern $VFO_3$ is detected. In consequence of this, the output of the loop filter 24 is rapidly decreased, greatly disturbing the output VCOCK of the VCO 25 and erroneously driving the PLL circuit 2. In such case as above, it may be feared that the reproduction data in the data field be unable to be reproduced.

FIG. 7 is a timing chart showing the operation of the PLL circuit 2 in the data field DT when the fixed pattern $VFO_3$ is missing. When the disk reproduction data DRD is impossible to be obtained due to the lost of the fixed pattern $VFO_3$, no signal to be compared is inputted to the phased comparator 22 even though the read gate is opened, and the pulse width of the pulse signal PC of the phase comparator 22 becomes such a length as to enable detection of the disk reproduction data DRD. The charge pump 23 continues to discharge the electric field of the loop filter 24. In this case, since the output LF of the loop filter 24 exceeds the level indicated by a dot and line when it is locked in the disk reproduction data DRD, the frequency of the reproduction clock VCOCK of the VCO 25 is excessively low, thus disturbing the operation of the PLL circuit 2. At this time, although the lock decision circuit 5 forcibly changes the mode to the low speed pull-in mode before the sync pattern SYNC since the counter completes counting of the reference clocks 2FCK, the output LF of the loop filter 24 is beyond the level when the data is locked and therefore, the low speed mode cannot meet to the intention for locking, causing reproduction errors. If the errors are beyond the correction ability of the error correction circuit 6, the data is impossible to be reproduced.

The data in the header field HD can be presumed from the preceding and succeeding sectors even if the data is impossible to be reproduced. However, the data in the data field DT is different for every sector and the content thereof is unable to be detected from the sectors before and after the data field DT. Therefore, when the data is judged unable to be reproduced and reproductions are repeatedly tried, if the fact that the data is unable to be reproduced results from defects of the medium, e.g., voids etc., not from the adhesion of foreign obstacles to the fixed pattern of the data field DT, the repeated reproductions are turned in vain.

SUMMARY OF THE INVENTION

This invention has been devised to solve to the above-mentioned disadvantages.

A first object of this invention is to provide a digital data reproduction apparatus adapted to prevent reproduction errors in a data field even in the presence of defects in the reproduction data in the data field, which is so arranged as to keep a read gate opened all through from the detection of a fixed pattern in a header field to the completion of the data reproduction in the data field, thereby allowing the phase locking in the data field in a low-speed pull-in mode, with lowering the responding capability to the defects.

A second object of this invention is to provide a digital data reproducing apparatus adapted to prevent reproduction errors in a data field by opening read gate with the detection timing of a fixed pattern for phase locking in the data field before starting the phase locking.

A third object of this invention is to provide a digital data reproduction apparatus adapted to prevent reproduction errors in a data field even in the presence of defects in the reproduction data in the data field, so arranged that the timing with which a fixed pattern of the data field is detected is sequentially delayed every time the reproduction is retried.

The above and further objects and features of the invention will more fully be apparent from the following detailed description with accompanying drawings.

DESCRIPTION OF THE PREFERRED EMBODIMENTS

An digital data reproducing apparatus according to preferred embodiments of this invention will be discussed more in detail hereinafter with reference to the accompanying drawings.

Figure 8:
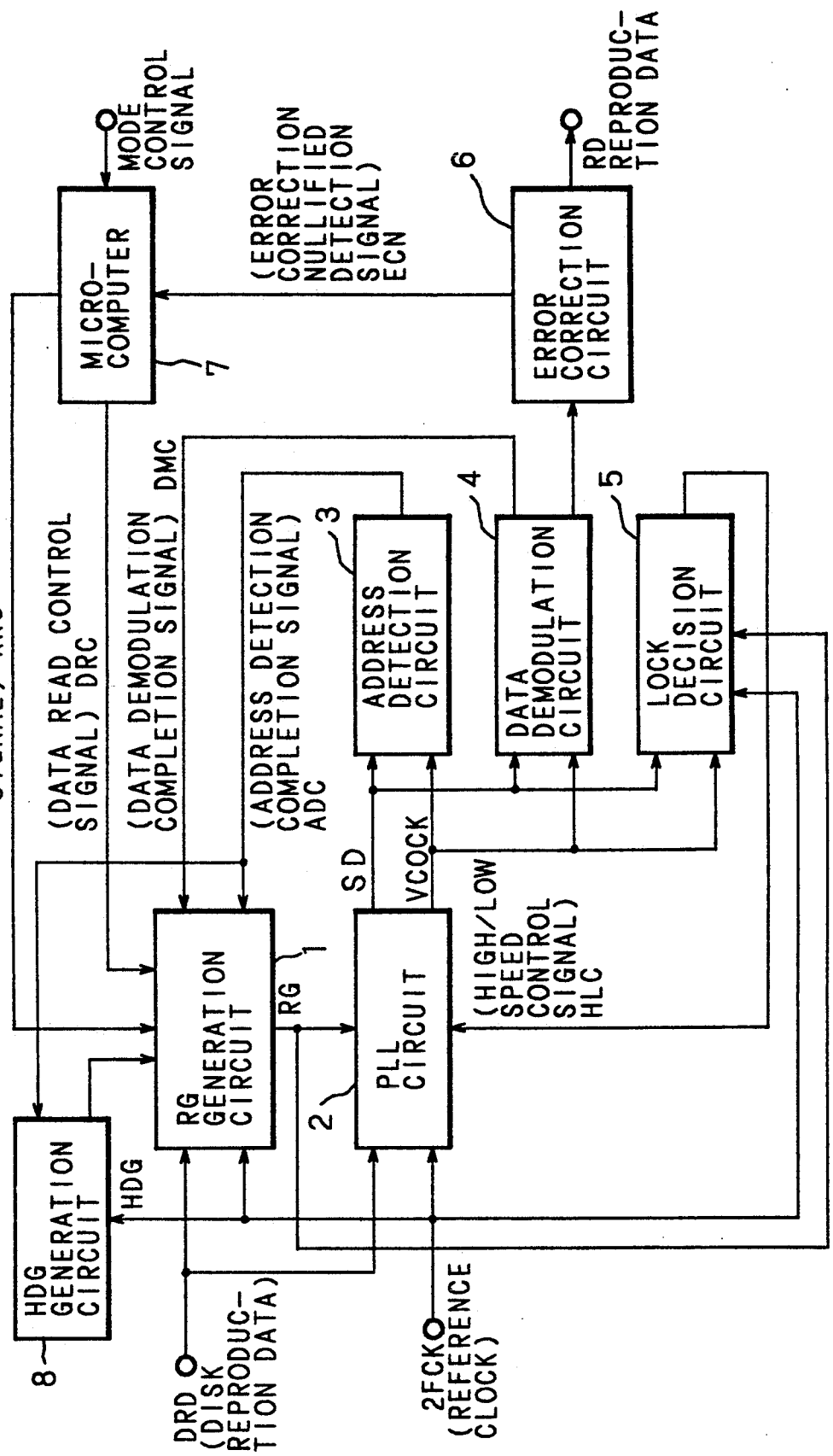
FIG. 8 is a structural block diagram of a digital data reproducing apparatus according to this invention.

FIG. 8 is a block diagram illustrating the structure of a digital data reproducing apparatus of this invention (referred to as an apparatus of this invention hereinafter). The apparatus of this invention reproduces an optical disk of FIG. 1 formatted in compliance with the TSO standard.

In FIG. 8, disk reproduction data DRD from an optical disk (not shown) is fed to an RG generation circuit 1 which generates a read gate signal RG to determine the reproduction term, and also to a PLL circuit 2 which synchronizes the phases of the DRD and a reproduction clock VCOCK when the read gate signal RG is open. The phase of a reference clock 2FCK inputted to the PLL circuit 2 is synchronized with the reproduction clock VCOCK when the read gate signal RG is closed. The reference clock 2FCK is supplied to the RG generation circuit 1, an HDG generation circuit 8 and a lock decision circuit 5 as well. A data read control signal DRC and a retry read control signal RRC from a microcomputer 7 which will be described later, a data demodulation completion signal DMC from a data demodulation circuit 4, and an address detection completion signal ADC from an address detection circuit 3 are also inputted to the RG generation circuit 1. The RG generation circuit 1 generates the read gate signal RG based on the above-mentioned six input signals. Moreover, a header/data gate signal HDG is given from the HDG generation circuit 8 to the RG generation circuit 1, so that the fixed pattern VFO when the PLL operation is pulled into is distinguished. The header/data gate signal HDG becomes "1" in the header field HD and "0" in the data field DT. Meanwhile, the read gate signal RG is outputted such that it is always "1" in the header field, opening the read gate, whereas it becomes "1" at the reproduction time in the data field DT, thereby opening the read gate. The outputted read gate signal RG is sent to the PLL circuit 2, controlling the timing when the PLL operation is started or stopped. A high/low speed control signal HLC is fed to the PLL circuit 2 from the lock decision circuit 5, and therefore, the pull-in of the PLL operation up to the completion of locking can be switched between high or low speed by the PLL circuit 2. The PLL circuit 2 generates a sync data SD and the reproduction clock VCOCK to the address detection circuit 3, a data demodulation circuit 4 and the lock decision circuit 5.

Figure 1:
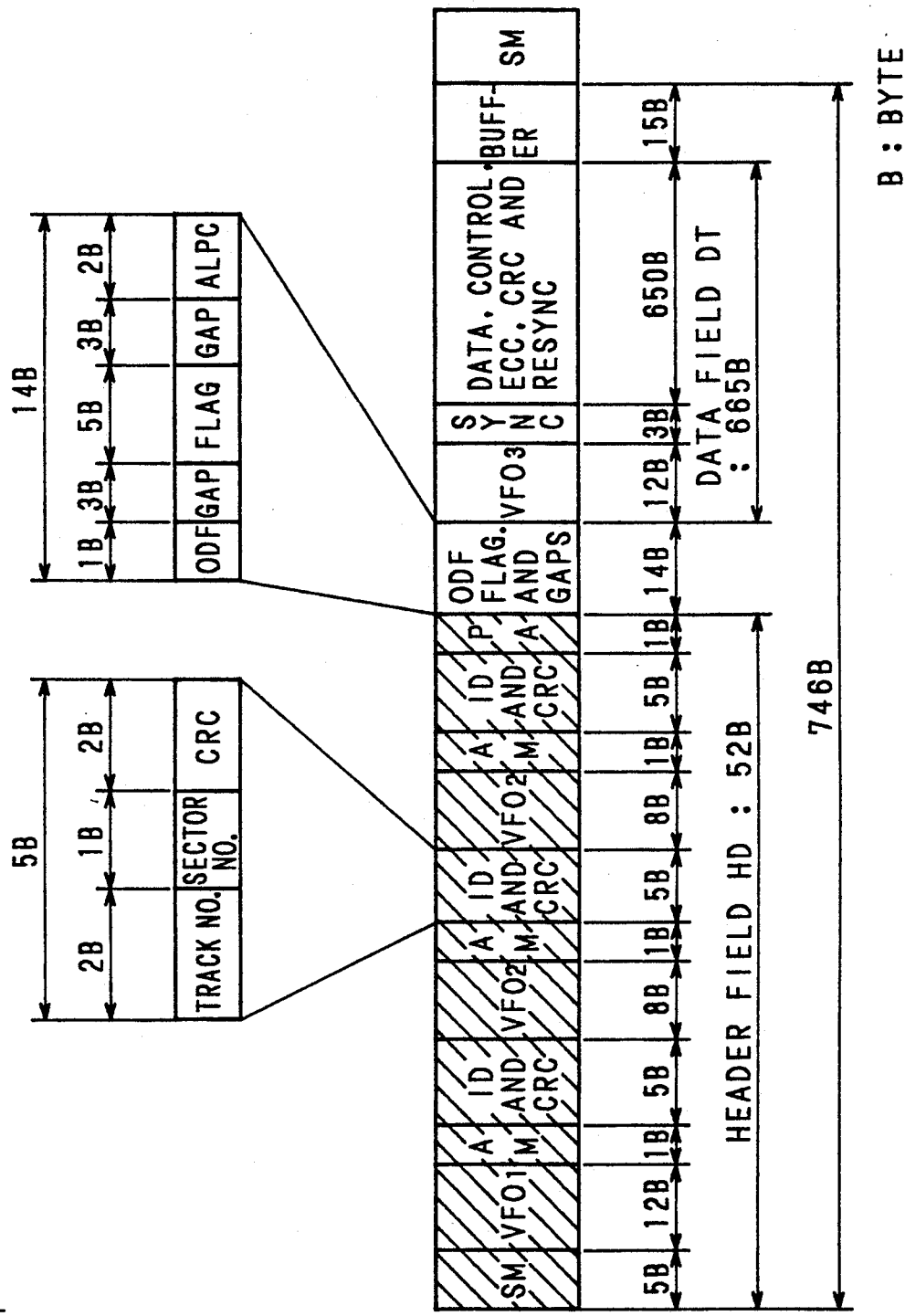
FIG. 1 shows a format within one sector of an optical disk in compliance with the ISO standard.
Figure 2:
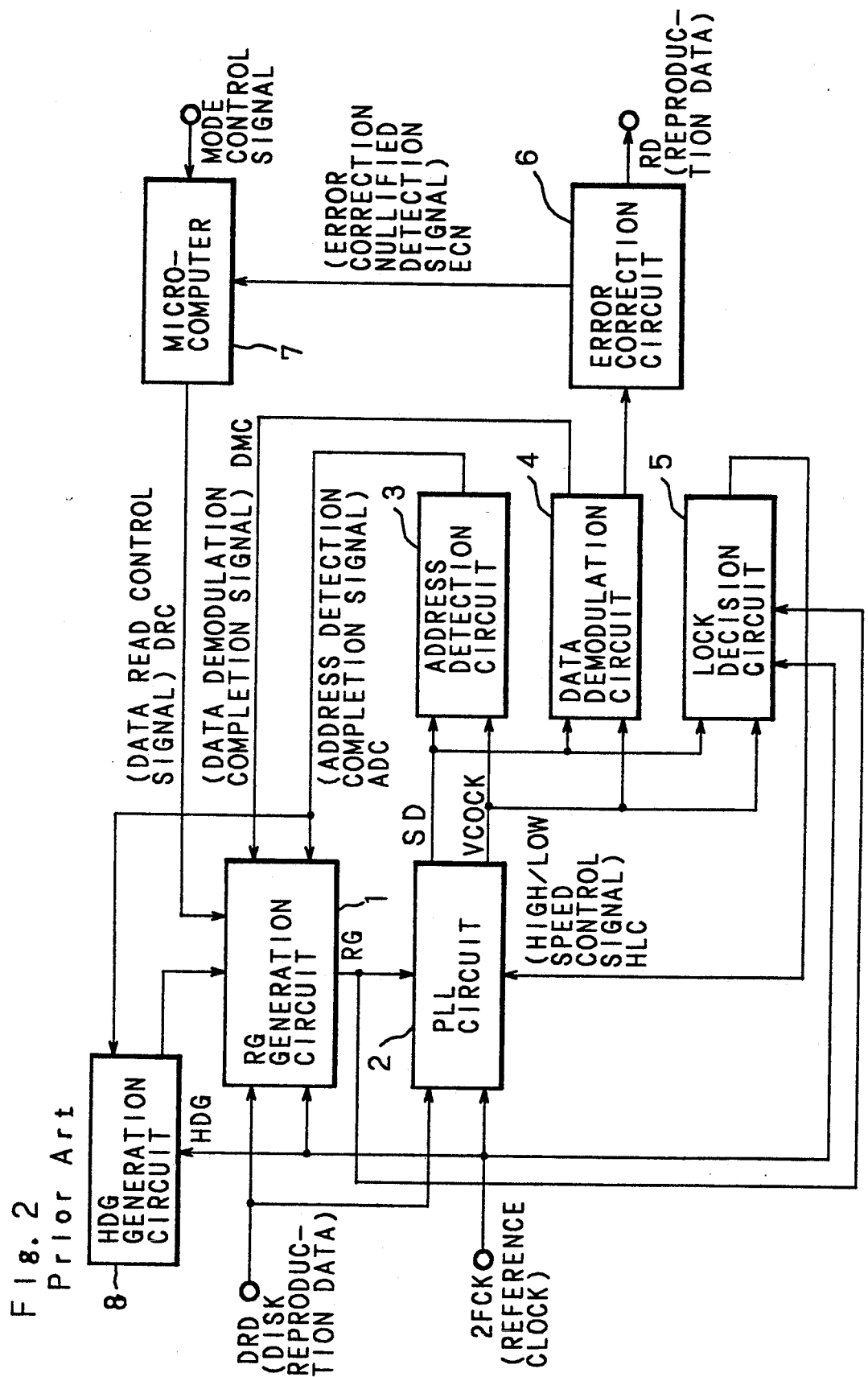
FIG. 2 is a structural block diagram of a conventional digital data reproducing apparatus.
Figure 3:
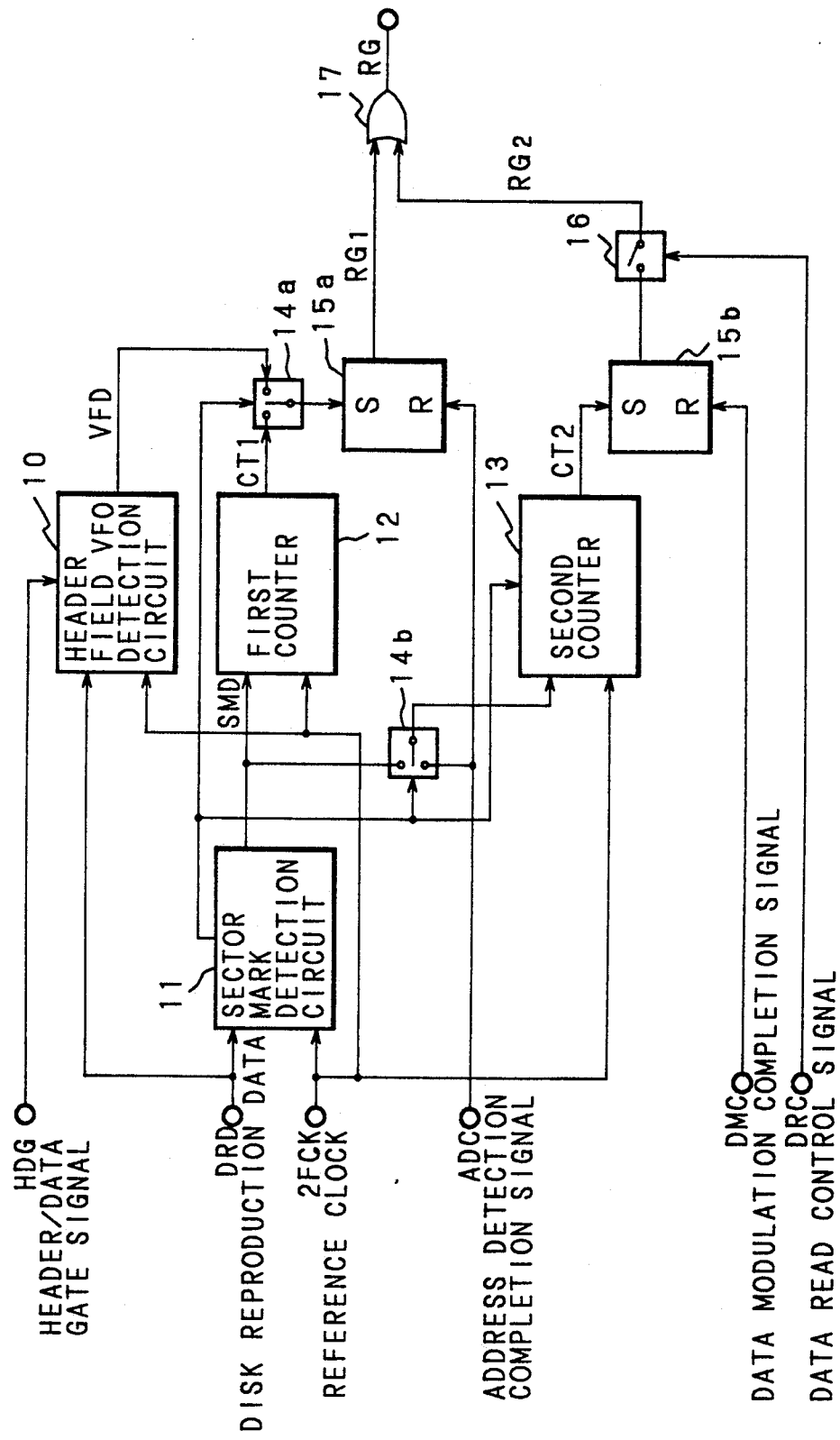
FIG. 3 is a structural block diagram of an RG generation circuit used in the conventional digital data reproducing apparatus.

The address detection circuit 3 detects the address information ID of the header field HD of the optical disk from the sync data SD, with outputting the address detection completion signal ADC. The data demodulation circuit 4 performs forms (2,7) demodulation of the sync data SD by the (2,7) demodulation signal and reproduction clock VCOCK, sends the demodulated data to an error correction circuit 6 and generates the data demodulation completion signal DMC. The lock decision circuit 5 detects whether or not the PLL circuit 2 locks from the phase difference between the sync data SD of the fixed pattern VFO stored in the header field HD and data field DT and, the reproduction clock VCOCK. When the PLL circuit 2 is in the unlocking state, the circuit 5 generates the high/low speed control signal HLC "0" to the circuit 2, or if the PLL circuit 2 is in the locking state, the circuit 5 generates the high/low speed control signal "1" to the circuit 2. The lock decision circuit 5 has a counter to be used when the PLL circuit 2 is unable to lock the reproduction clock VCOCK to the disk reproduction data DRD. This counter counts the number of reference clocks 2FCK. In the above case where the PLL circuit 2 is unable to lock the reproduction clock VCOCK, when the counter counts a preset number of clocks, the high/low speed control signal HLC of "1" is outputted. The error correction circuit 6 detects an error of the modulated data, corrects the data with use of an error correction code according to a predetermined operation and then, outputs a reproduction data RD after the correction. At the same time if the correction is impossible, an error correction nullified detection signal ECN indicating the fact is outputted from the error correction circuit 6 to the microcomputer 7. In the case of the optical disk formatted as indicated in FIG. 1, the error correction circuit 6 can correct 8B at the maximum in the coding direction and can correct up to 40B continuously. The microcomputer 7, when receiving the error correction nullified detection signal ECN, outputs the retry read control signal RRC to the RG generation circuit 1.

A counter is provided inside the HDG generation circuit 8. When the HDG generation circuit 8 receives the address detection completion signal ADC and reference clock 2FCK, it changes the header/data gate HDG from "1" to "0" at the inputting timing of the address detection completion signal ADC. Upon completion of counting of a predetermined number of clocks at the timing related to the rear end of the data field DT, the circuit 8 changes the header/data gate HDG from "0" to "1". The header field HD is distinguished from the data field DT by the header/data gate HDG.

Figure 9:
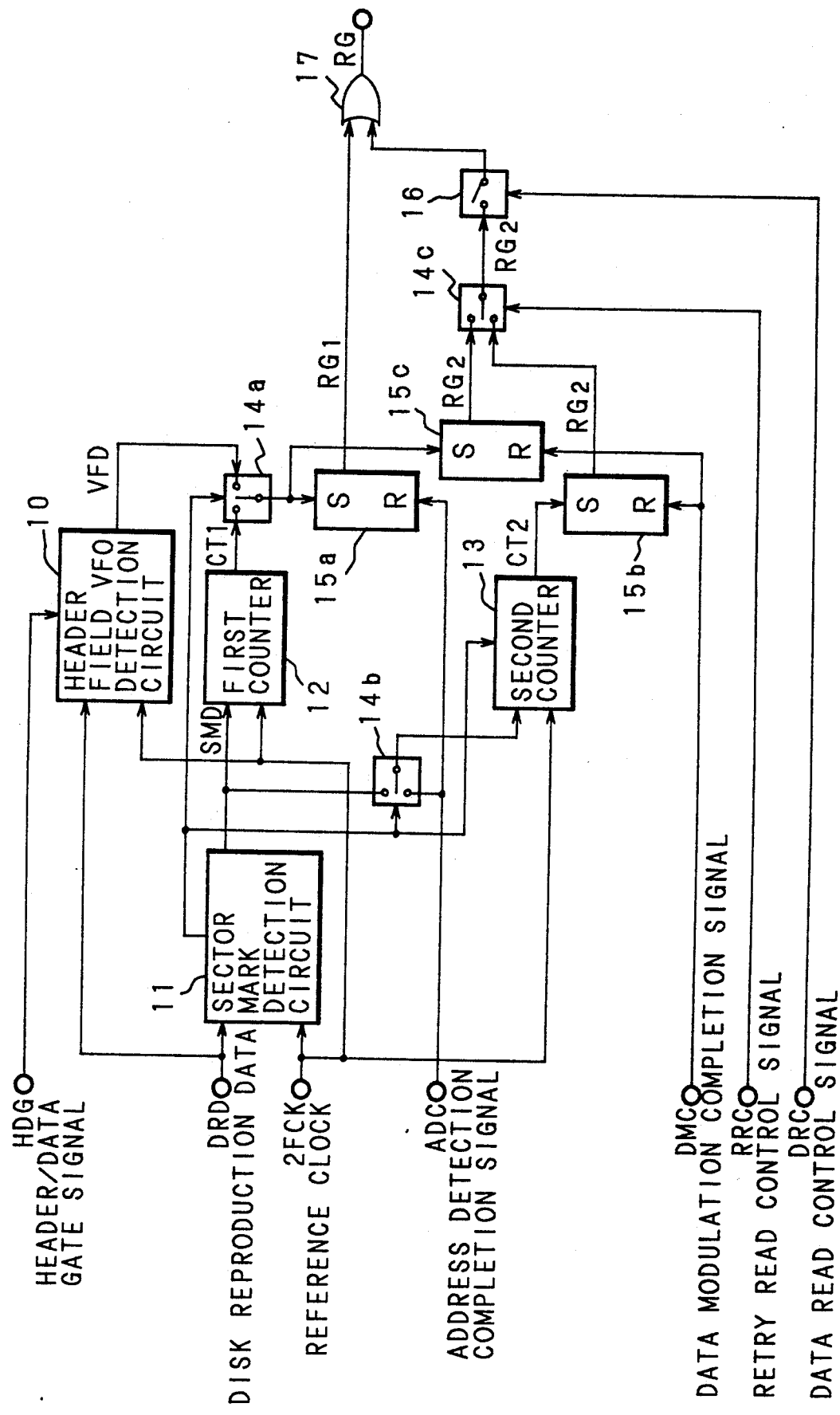
FIG. 9 is a structural block diagram of an RG generation circuit of the digital data reproducing apparatus of this invention.

FIG. 9 is a structural block diagram of the RG generation circuit 1 of the apparatus of the invention.

The disk reproduction data DRD is applied to a sector mark detection circuit 11 which detects the sector mark SM of the header field HD and to a header field VFO detection circuit 10 which detects fixed patterns $VFO_1$, $VFO_2$ of the header field HD. The reference clock 2FCK is given to the sector mark detection circuit 11, header field VFO detection circuit 10, a first counter 12 and a second counter 13.

The sector mark detection circuit 11 samples the disk reproduction data DRD with the timing when the reference clock 2FCK is outputted, detecting a low frequency pattern with which the sector mark SM is recorded (a pattern having continuous "1"s or "0"s), and outputting the sector mark detection signal SMD to the first counter 12 and a latch output to a selector 14a,14b and the second counter 13 described later.

The first counter 12 determines the timing with which the read gate of the header field HD is opened. When the first counter 12 receives the sector mark detection signal SMD from the sector mark detection circuit 11, the counter starts counting the number of reference clocks 2FCK at that time point. When the counter 12 finishes counting, it generates a first count completion signal CT1 to a selector 14a. To the header field VFO detection circuit 10 is applied the header/data gate signal HDG. The header file VFO detection circuit 10 samples the disk reproduction data DRD with the inputting timing of the reference clock 2FCK and detects the first fixed pattern $VFO_1$ of the header field HD when the header/data gate signal HDG is "1", with outputting a VFO detection signal VFD to the selector 14a. The selector 14a in turn selects the first count completion signal CT1 or VFO detection signal VFD in accordance with the detecting result of the sector mark SM. In other words, when the sector mark SM is detected, the latch output of the sector mark detection signal SMD is retained "1" until the next sector mark SM is detected, whereby the selector 14a selects the first count completion signal CTI. The selected signal CT1 is sent to set terminals of flip-flops 15a and 15c respectively. The flip-flops 15a and 15c are set with the outputting timing of the signal CT1 thereby turning read gate signals $RG_1$ and $RG_2$ to "1"s respectively and opening the read gate.

If the sector mark SM is not detected and the latch output is "0", the selector 14a selects the VFO detection signal VFD, applying the same to the set terminals of the flip-flops 15a and 15c respectively. Accordingly, the flip-flops 15a and 15c are set with the detecting timing of the signal VFD, turning the read gate signals $RG_1$ and $RG_2$ to "1"s and opening the read gate.

In the meantime, the timing when the read gate is closed, namely, when the flip-flop 15a is reset is the detecting timing of the address detection completion signal ADC. The read gate signal RDI is turned "0" at this timing, thereby closing the read gate.

The second counter 13 counts the number of reference clocks 2FCK to determined the timing when the read gate of the data field DT is opened. A first and a second numbers of clocks are set by the latch output from the sector mark detection circuit 11. The number of clocks is started to be counted with the timing when the address detection completion signal ADC selected by the selector 14b or the sector mark detection signal SMD is inputted.

The selector 14b generally selects the sector mark detection signal SMD when receiving the latch output of "1" from the sector mark detection circuit 11. The second counter 13, upon receipt of the sector mark detection signal SMD, starts to count the number of reference clocks 2FCK. When the first number of clocks is completely counted, a second count completion signal CT2 is outputted to a set terminal of a flip-flop 15b from the second counter 13. When the sector mark SM is not detected (latch output "0"), the second counter 13 starts counting when it receives the address detection completion signal ADC. After the counter 13 finishes counting of the second number of clocks, it generates the second count completion signal CT2. The flip-flop 15b is set with the inputting timing of the second count completion signal CT2, turning a read gate signal $RG_2$ of the data field DT to "1", with opening the read gate. The flip-flops 15b and 15c are reset by the data demodulation completion signal DMC, when the read gate signal $RG_2$ is turned to "0" and the read gate is closed.

The read gate signal $RG_1$ outputted from the flip-flop 15a is inputted to one input terminal of an OR gate 17, and the read gate signals $RG_2$ outputted from the flip-flops 15b and 15c are inputted to a selector 14c. The selector 14c is switched by a retry read control signal RRC from the microcomputer 7 to select the read gate signal $RG_2$ from the flip-flop 15c at the retry time. The read gate signal $RG_2$ from the selector 14c is, through a switch circuit 16, inputted to the other input terminal of the OR gate 17. An output of the OR gate 17 is sent to the PLL circuit 2 as the read gate signal RG. The switch circuit 16 is turned ON or OFF by the data read control signal DRC of "1" or "0" from the microcomputer 7. When the data is read, the switch circuit 16 is turned ON, thereby transmitting the read gate signal $RG_2$.

Figure 4:
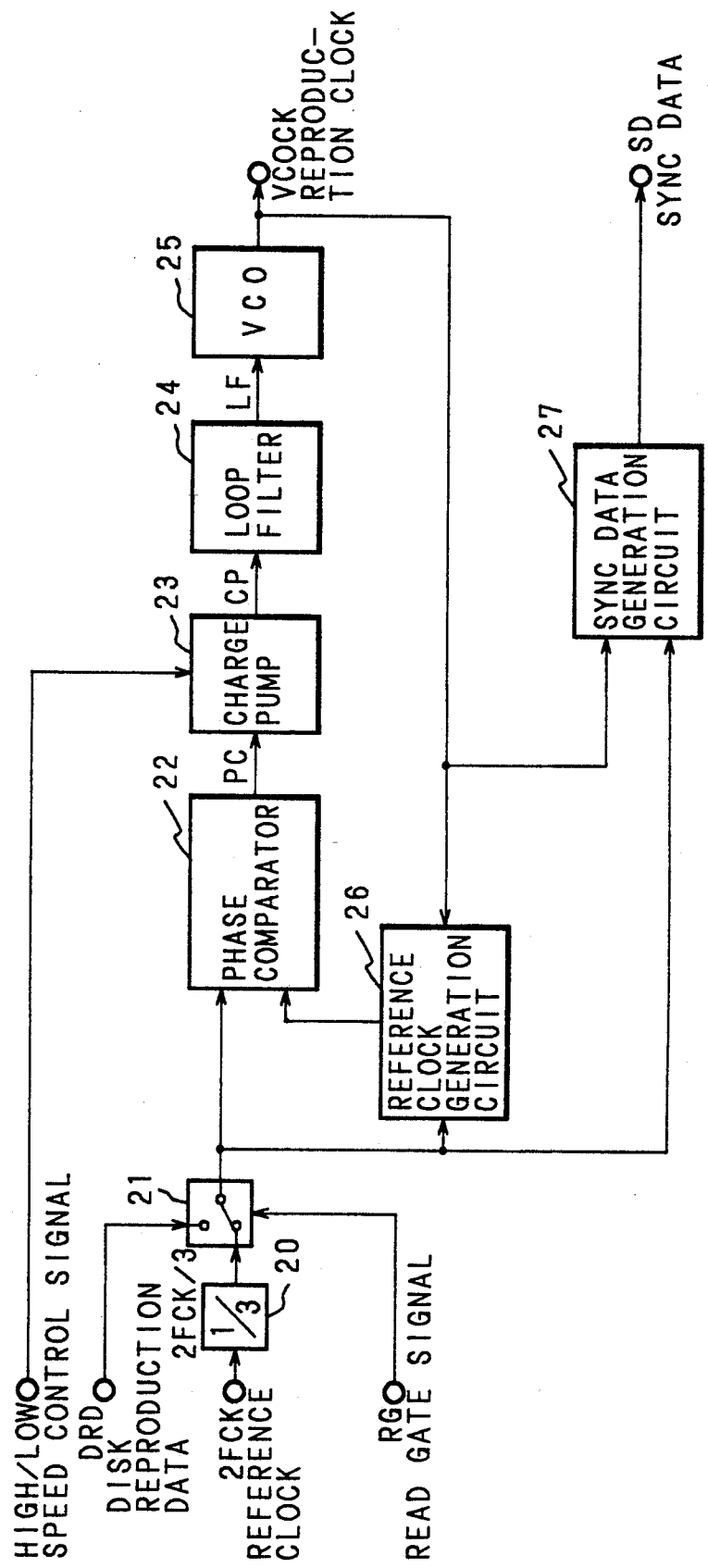
FIG. 4 is a structural block diagram of a PLL circuit used in the conventional digital data reproducing apparatus.
Figure 5:
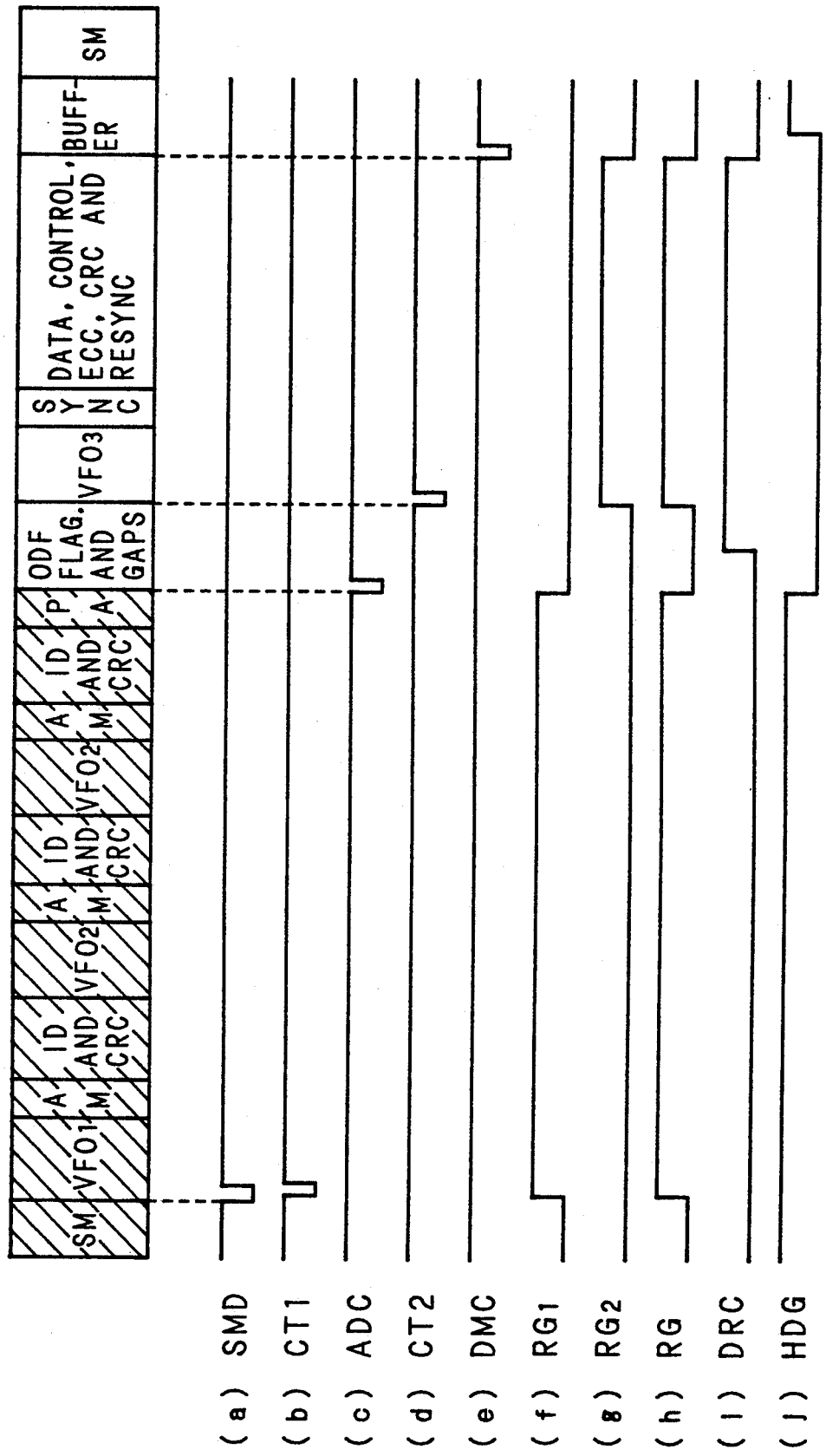
FIG. 5 is a timing chart of signal waveforms at each part when the data is reproduced in the conventional digital data reproducing apparatus.
Figure 6:
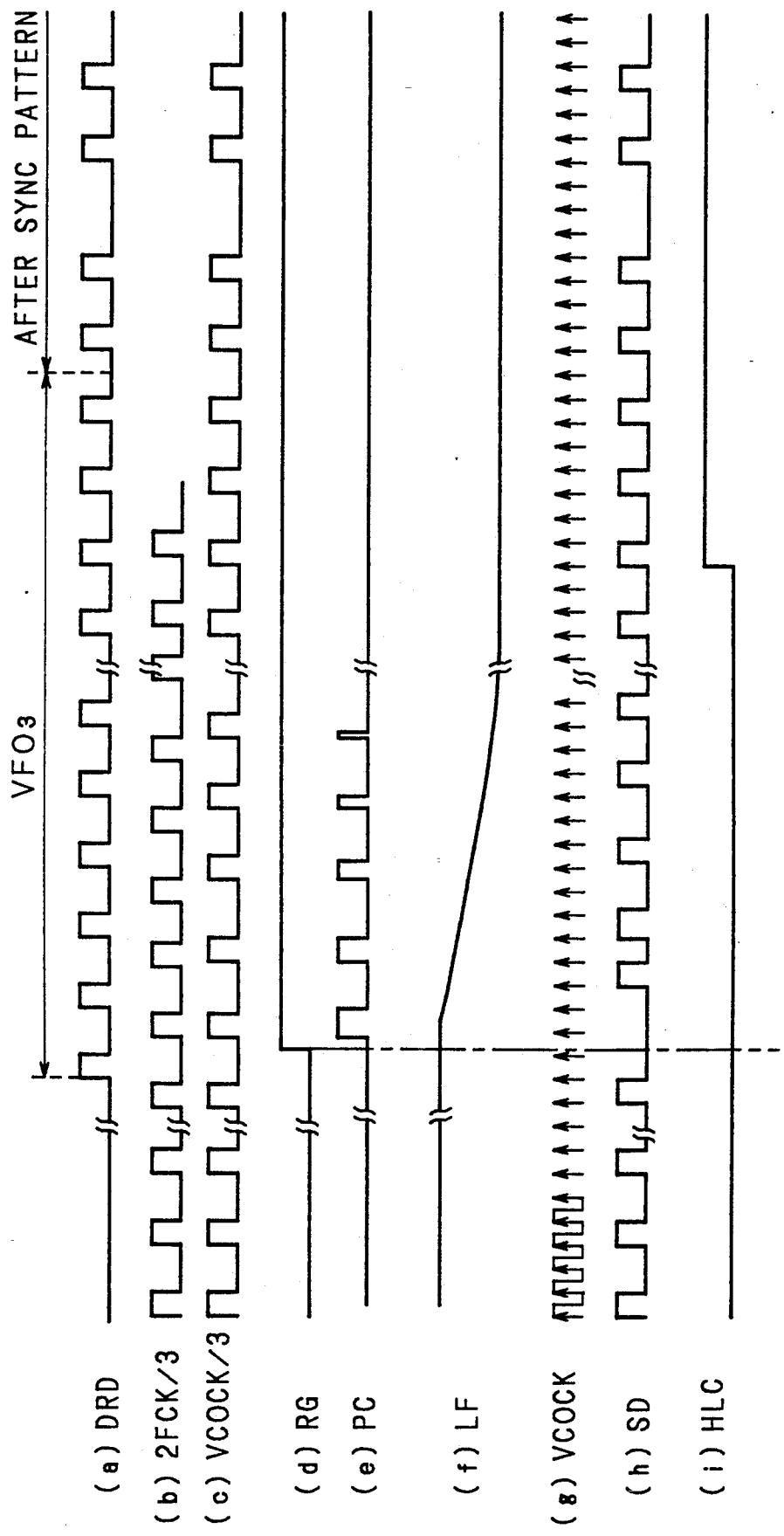
FIGS. 6 and 7 are timing charts of the operation of the PLL circuit.
Figure 7:
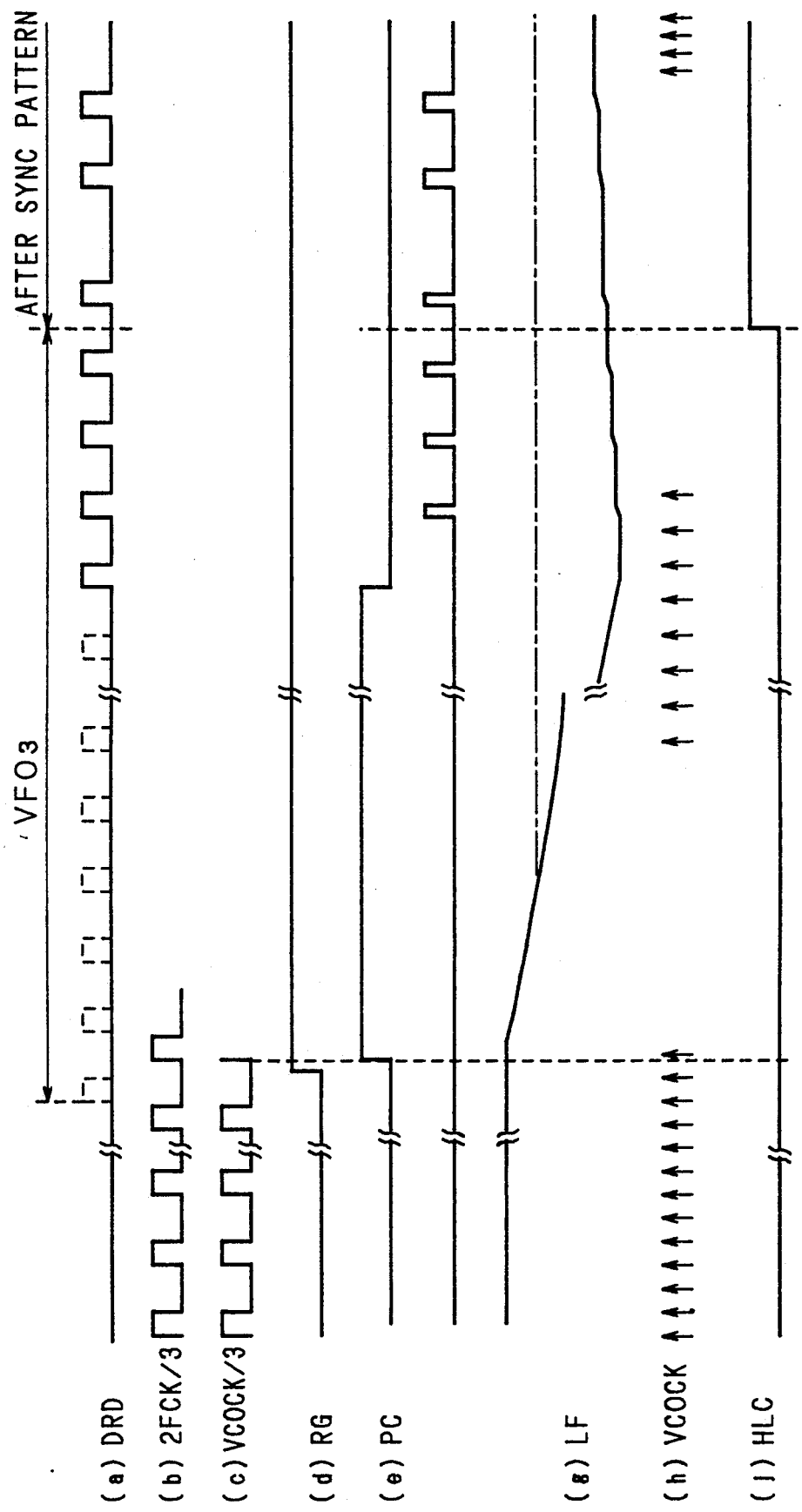

The PLL circuit 2 employed in the apparatus of this invention is the same as is shown in FIG. 4, and the description thereof will be abbreviated here. It is to be noted, however, that the PLL circuit 2 has two pull-in modes, namely, high speed pull-in mode and low speed pull-in mode which are switched by the high/low speed control signal HLC from the lock decision circuit 5. When the pull-in of the PLL is started, the PLL circuit 2 performs the pull-in in the high speed mode with high responding efficiency, thereby locking the reproduction clock VCOCK to the disk reproduction data DRD. After locking the PLL circuit 2 lowers its responding efficiency in the low speed mode and carries out the pull-in in a manner to prevent locking from being released.

Figure 10:
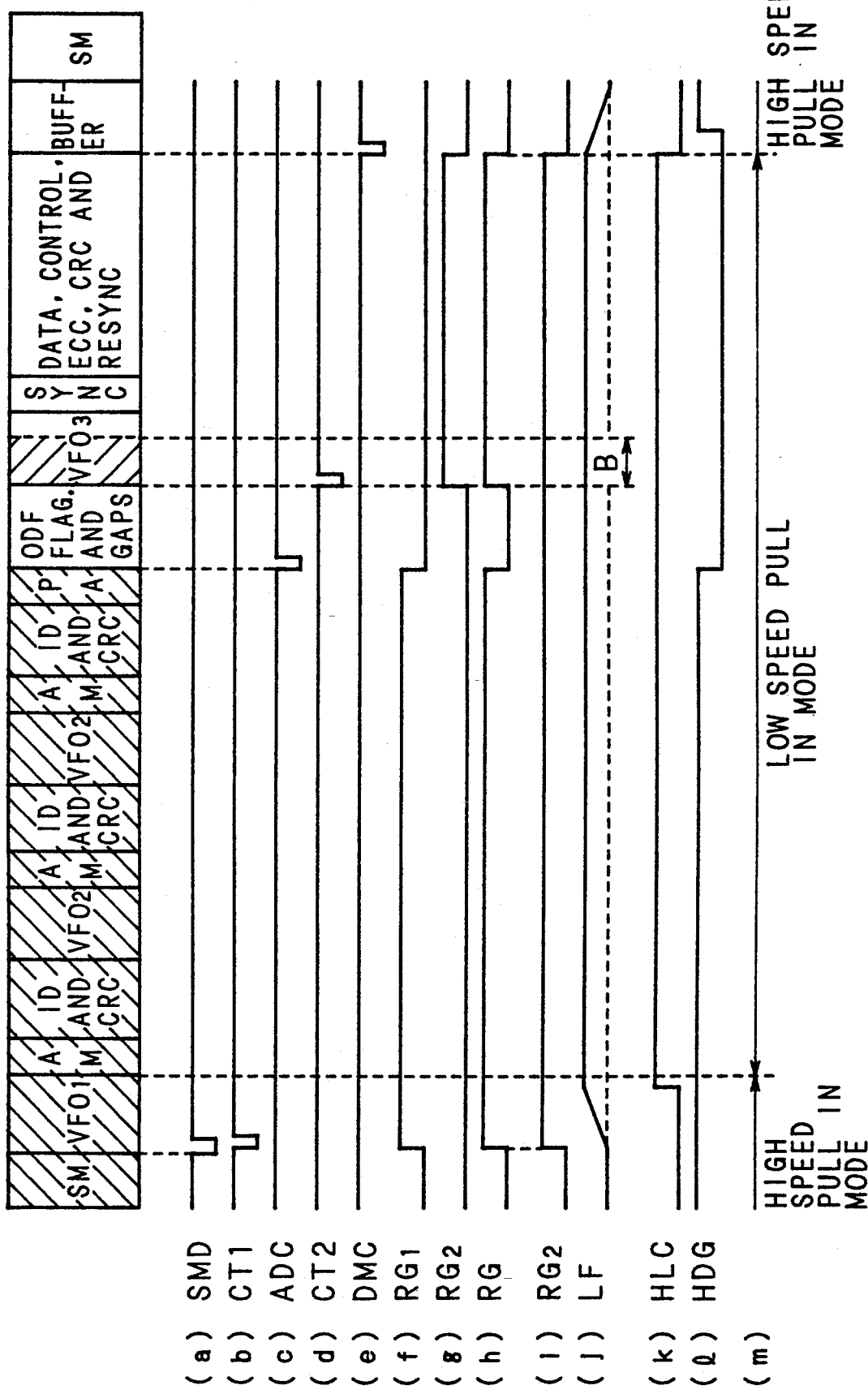
FIG. 10 is a timing chart of signal waveforms at each part when the data is reproduced in the digital data reproducing apparatus of this invention.

Now, the operation of the apparatus of this invention in the above-described structure will be depicted with reference to a timing chart of FIG. 10 which shows the signal waveforms at each part of the RG generation circuit 1 at the reproduction time.

When the sector mark SM is detected at the general reproduction time, the sector mark detection signal SMD is changed from "1" to "0" for one cycle of the reference clock 2FCK (FIG. 10(a)). In consequence, the first counter 12 starts counting, and outputs the first count completion signal CT1 of "0" (FIG. 10(b)). When the first count completion signal CT1 of "0" is outputted, the flip-flop 15a is set and the read gate signal $RG_1$ is changed from "0" to "1" (FIG. 10(f)). As the address detection completion signal ADC showing the rear end of the header field HD is turned to "0" (FIG. 10(c)), the flip-flop 15a is reset, and the read gate signal $RG_1$ becomes "0" from "1", whereby the read gate of the header field HD is closed (FIG. 10(f)).

Subsequently, the flip-flop 15b is set with the timing when the second count completion signal CT2 is outputted from the second counter 13 (FIG. 10(d)), and the read gate signal $RG_2$ of the data field DT is changed from "0" to "1" (FIG. 10(g)). Accordingly, the read gate is opened until the "0" data demodulation signal DMC is outputted (FIG. 10(e)). At this time, the switch circuit 16 is turned ON by the data read control signal DRC of "1" from the microcomputer 7, and two read gate signals $RG_1$ and $RG_2$ are inputted to the OR gate 17 from which the read gate signal RD is outputted to the PLL circuit 2 (FIG. 10(h)).

On the other hand, at the retry read time, the selector 14c is switched to the side of the flip-flop 15c by the retry read control signal RRC. The read gate signal RG becomes "1" with the timing when the first count completion signal CT1 is outputted and the read gate is opened. Then, the read gate signal RG is turned to "0" with the timing when the data demodulation completion signal DMC becomes "0", whereby the read gate is closed (FIG. 10(i)). Therefore, the read gate is kept opened at all times from the header field HD to the data field DT. The lock decision circuit 5 continues outputting the high/low speed control signal HLC of "1" until the data is completely demodulated once it judges locking of the data (FIG. 10(k)). The output LF of the loop filter 24 in the PLL circuit 2 shown in FIG. 4 is kept in the state as is switched to the low speed pull-in mode in the header field HD (FIG. 10(m)), i.e., in the level as is locked to the disk reproduction data DRD (FIG. 10(j)). Accordingly, the output LF of the loop filter 24 only changes while catching up with the change of the low frequency, for example, of rotational jitters. Even if a defective area B is present in the fixed pattern $VFO_3$ at the head of the data field HD, since the PLL circuit 2 is held in the low speed pull-in mode with low responding efficiency, the circuit does not respond to the defective area B, without large disturbances of the PLL and separation of locking. Thus, the reproduction clock VCOCK can be locked to the data in the data field DT, making it possible to prevent reproduction errors.

Figure 11:
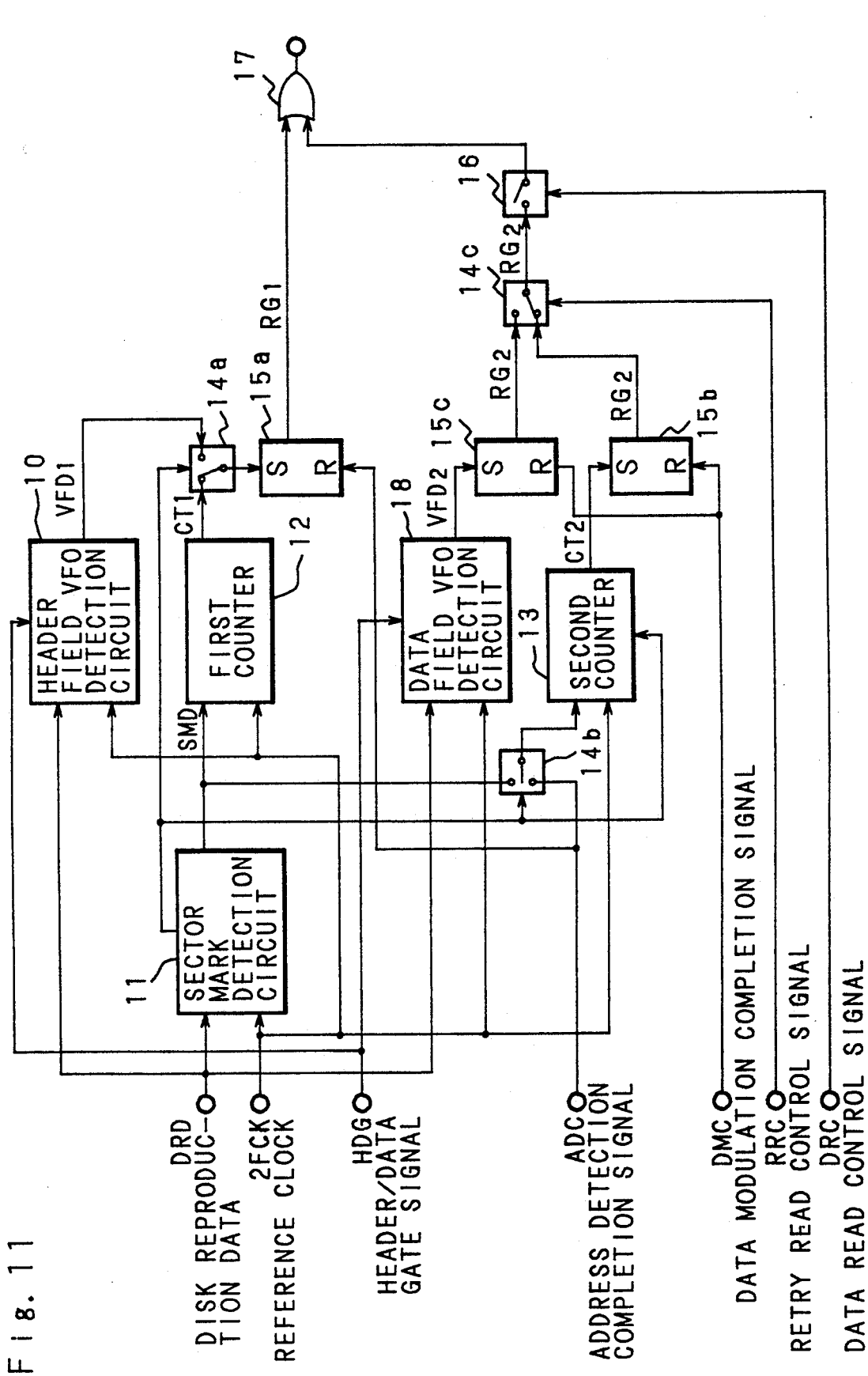
FIG. 11 is a structural block diagram of a digital data reproducing apparatus according to a second embodiment of this invention.

Another embodiment of this invention will be described below. FIG. 11 is a structural block diagram of an RG generation circuit 1 according to a second embodiment of this invention.

Although the read gate signal $RG_2$ is guided from the header field HD to the data field DT to open the read gate in the first embodiment, according to the second embodiment, the read gate signal $RG_2$ of the data field DT is opened after the fixed pattern $VFO_3$ of the data field DT is detected. The description below will accordingly be directed mainly to the difference between the first and second embodiments. The disk reproduction data DRD and reference clock 2FCK are fed to the header field VFO detection circuit 10 and sector mark detection circuit 11, and moreover inputted to a data field VFO detection circuit 19. The data field VFO detection circuit 18 detects the fixed pattern $VFO_3$ of the data field DT at the retry read time. In other words, the data field VFO detection circuit 18 detects the fixed pattern $VFO_3$ by detecting the "100" pattern of the disk reproduction data DRD when the header/data gate is closed to be "0". A VFO detection signal VFD2 is inputted to a set terminal of the flip-flop 15c, thereby setting the flip-flop 15c and outputting the read gate signal $RG_2$ from the flip-flop 15c. The flip-flop 15c is reset by the data demodulation completion signal DMC, similar to the first embodiment. At the retry read time, the selector 14c selects the read gate signal $RG_2$ of the flip-flop 15c by the retry read control signal RRC and inputs the same to the other input terminal of the OR gate 17 through the switch circuit 16. In consequence, the pull-in is started in the high speed mode in the data field DT. If the PLL operation is continued in the high speed mode also in the sync pattern SYNC after the fixed pattern $VFO_3$ is finished but unlocked, the PLL operation would be disturbed. As such, the lock decision circuit 5 does not judge locking, but outputs the high/low speed control signal "1" when the internal counter completes counting of the reference lock 2FCK. Although the high speed mode may be switched in some cases to the low speed mode before locking is completed, it is possible to complete locking in the low speed mode in the data field afterwards.

Figure 12:
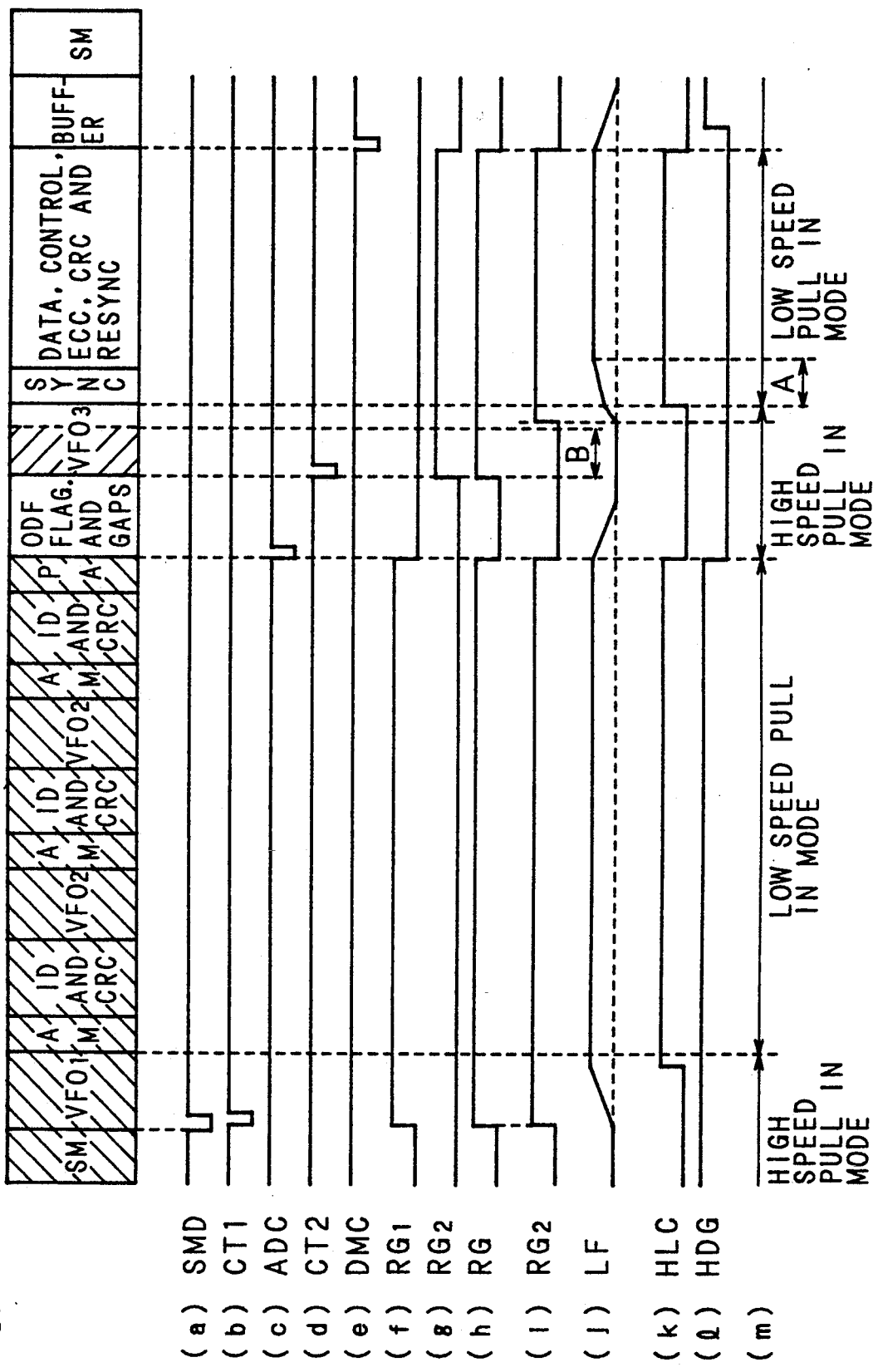
FIG. 12 is a timing chart of signal waveforms at each part of the apparatus according to the second embodiment.

FIG. 12 is a timing chart of signal waveforms at each part at the reproduction time in the second embodiment. Since the operations at the general read time shown in FIGS. 12(a) through 12(h) are carried out in the same manner as in the first embodiment, the description thereof will be abbreviated.

The read gate signal $RG_1$ of the header field HD becomes "0" at the retry read time with the timing when the address detection completion signal ADC is detected. The read gate signal $RG_2$ of the data field DT is turned "1" with the timing when the fixed pattern $VFO_3$ is detected by the data field VFO detection circuit. The read gate is not opened in the defective area B (FIG. 12(i)). Therefore, the output LF of the loop filter 24 is maintained at the level as locked in the header field HD, and then returned to the reference value once, and raised to the level at the locking time again in the data field DT (FIG. 12(j)). The lock decision circuit 5 detects locking in the header field HD, with outputting the high/low speed control signal HLC of "1" to turn the PLL circuit 2 to the low speed pull-in mode. Thereafter, the lock decision circuit 5 outputs the speed control signal HLC of "0" with the timing when the address detection completion signal ADC is outputted, so that the PLL circuit 2 is returned to the high speed pull-in mode. When the fixed pattern $VFO_3$ is completed after being detected in the data field DT, the lock decision circuit 5 generates the high/low speed control signal HLC of "1" again and the PLL circuit 2 is brought to the low speed pull-in mode (FIG. 12(k)). Accordingly, locking is actually not completed yet in the sync pattern SYNC of the data field DT and at the head portion A of the data area, resulting in reproduction errors of the data recorded there. However, since locking is intermittently continued in the low speed mode, it is possible to lock the data within the correction ability (continuously 40b or smaller) of the error correction circuit 6. Thus, corrections can be made by the correction circuit, without any fear that the data in the data field DT becomes impossible to be reproduced.

A third embodiment of this invention will be discussed below. Since the read gate signal $RG_2$ of the data field DT is opened when the fixed pattern $VFO_3$ of the data field DT is actually detected in the second embodiment as above, the data field VFO detection circuit 18 is necessitated in this embodiment. In contrast, according to the third embodiment, instead of detecting the fixed pattern $VFO_3$ of the data field DT, the outputting timing of the second count completion signal CT2 of the second counter is shifted by the microcomputer 7 sequentially for every retry read time to be delayed than at the general read time, so that the read gate is opened in the detection area of the fixed pattern $VFO_3$.

Figure 13:
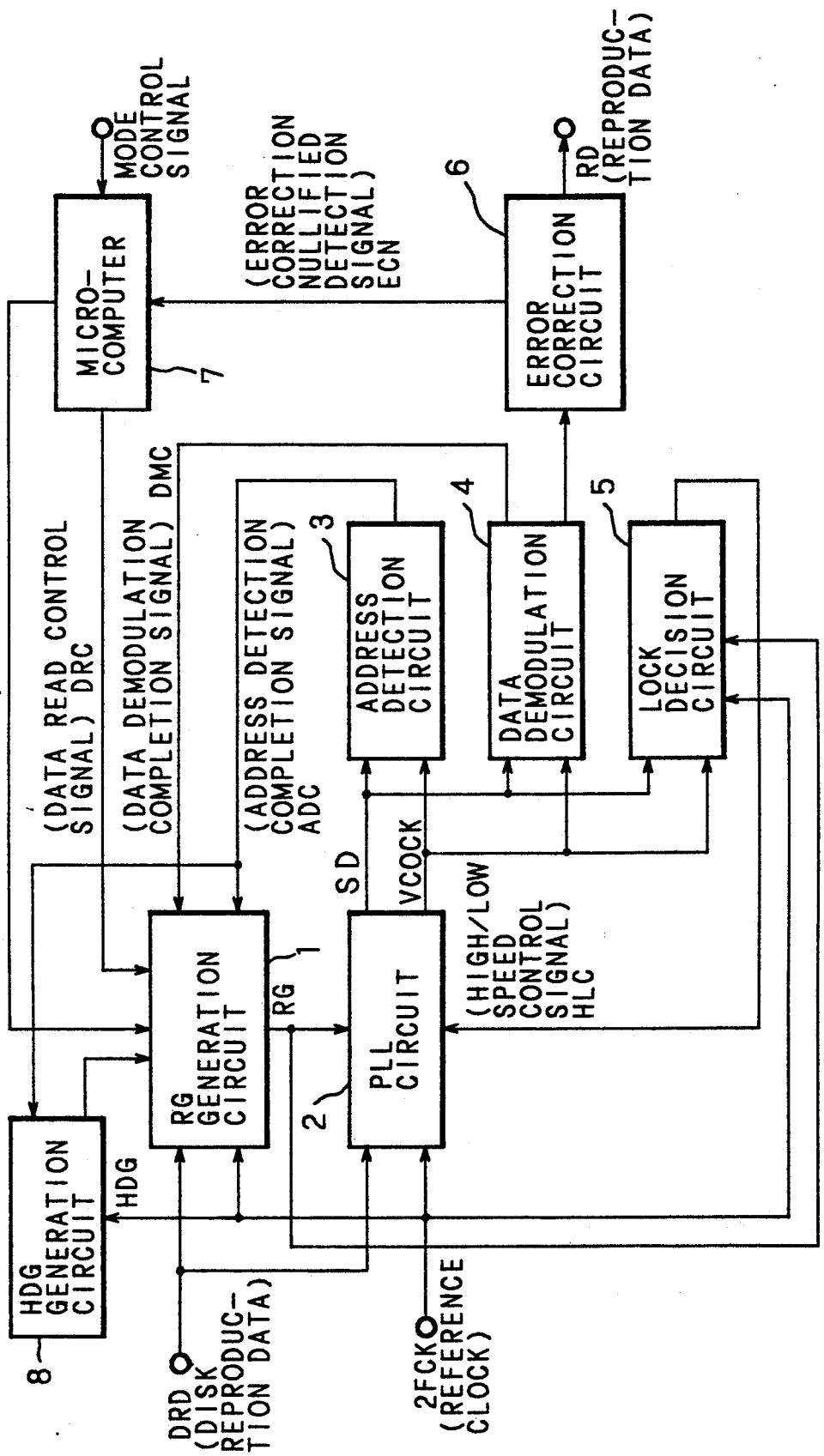
FIG. 13 is a structural block diagram of a digital data reproducing apparatus according to a third embodiment of this invention.
Figure 14:
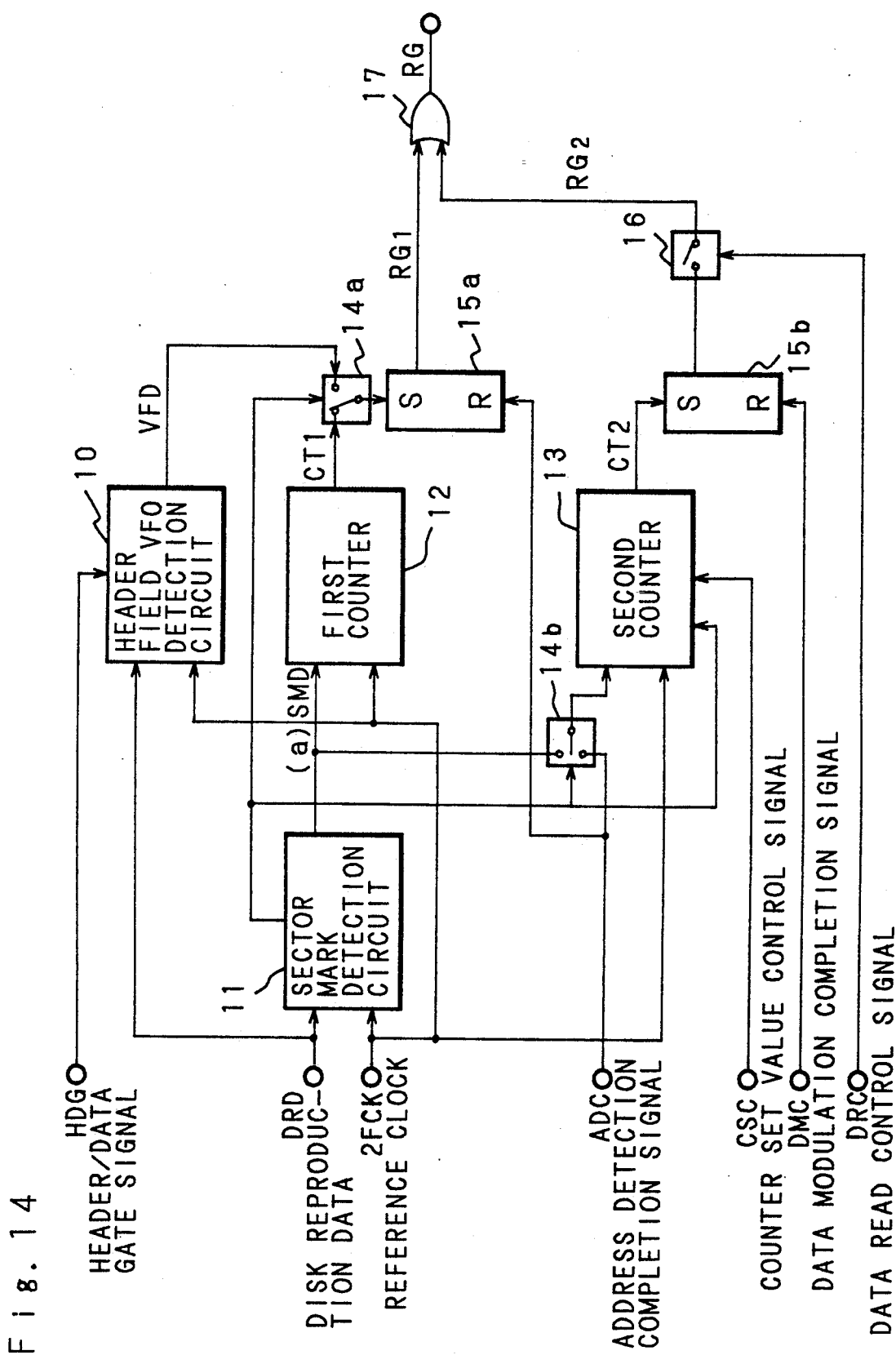
FIG. 14 is a structural block diagram of an RG generation circuit used in the apparatus of the third embodiment.

FIGS. 13 and 14 are block diagrams respectively showing the structure of an apparatus of this invention according to the third embodiment and an RG generation circuit 1 of the apparatus.

As shown in FIG. 13, the apparatus of this invention according to the third embodiment is different in the structure that the microcomputer 7 outputs a counter set value control signal CSC at the retry read time in response to an input of the error correction nullified signal ECN thereto. The other point in the structure are the same as in the first and second embodiments described earlier. More specifically, a set value of the second counter 13 can be changed optionally by the microcomputer 7 and the counter set value control signal CSC is arranged to be gradually delayed during several retry read times. Moreover, the RG generation circuit 1 requires, as is understood from FIG. 14, neither selector 14c, nor lip-flop 15c. The structure is more simplified as compared with that in the foregoing embodiments. The initial value of the second counter 13 is controlled every time of the retry read by the counter set value control signal CSC so that the read gate signal $RG_2$ of the data field DT is opened at the retry read time with the timing delayed than at the general read time. Therefore, even when a defective area exists in the fixed pattern $VFO_3$, the read gate signal $RG_2$ is prevented from being opened in the defective area B since the initial value is sequentially delayed every time the retry read is conducted, thereby stabilizing the PLL operation.

In the third embodiments as well as the second embodiment, the lock decision circuit 5 outputs the high/low speed control signal HLC of "0" with the timing when the end of the fixed pattern VFO3 comes since it is not still locked. Therefore, although there may be a fear that reproduction errors be brought about at the head of the sync pattern and data area, the reproduction error length is retained within the error correction ability of the correction circuit 6, and the error correction circuit 6 is enough to correct the continuous reproduction error.

A combination of the first and second embodiments or the first and third embodiments may be possible. For example, the first embodiment may be employed at the first retry read time, and the second or third embodiment is used at the retry read time afterwards when the data is unable to be reproduced. In this manner, undesirable separation or release of locking can be avoided at the part where no data is recorded between the header and data fields.

Furthermore, although any of the foregoing three embodiments employs the optical disk of 130 mm in the format of 512B, this invention is not limited to the above, and it is needless to say that this invention is applicable to an optical disk reproduction apparatus for reproducing all kinds of optical disks formatted to have the header field and data field separated from one another.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. An apparatus for reproducing digital data from a data recording medium having a sector format including: a field in which a sector mark for indicating the head position of the sector, a fixed pattern for phase locking between a reproduced data and a sampling clock of said reproduced data and an address data of the sector are pre-formatted; followed by a data field including a fixed pattern for phase locking between said reproduced data and said sampling clock of said reproduced data wherein said data field is substantially comprised of a user data, said apparatus comprising:

phase locking means for performing phase locking between said reproduced data and said sampling clock of said reproduced data in a high-speed or low-speed mode; and read gate opening/closing means for opening/closing a read gate through which the reproduced data is outputted to said phase locking means, wherein said read gate opening/closing means opens the read gate with a detection timing of said fixed pattern in said header field, and closes the read gate with a completion timing of said data reproduced from the data area of said data field, and wherein said phase locking means performs said phase locking of the reproduced data from said header field in the high-speed mode, and performs the phase locking of the reproduced data from said data field in the low-speed mode after said phase locking of said header field is completed until the phase locking of the reproduced data from said data field is completed.

2. An apparatus for reproducing digital data from a data recording medium having a sector format including a field in which a sector mark for indicating the head position of the sector, a fixed pattern for phase locking between a reproduced data and a sampling clock of said reproduced data and an address data of the sector are pre-formatted; followed by a data field including a fixed pattern for phase locking between said reproduced data and said sampling clock of said reproduced data wherein said data field is substantially comprised of a user data, said apparatus comprising:

phase locking means for performing phase locking between said reproduced data and said sampling clock of said reproduced data in a high-speed or low-speed mode; and read gate opening/closing means for opening/closing a read gate through which the reproduced data is outputted to said phase locking means, wherein said read gate opening/closing means opens the read gate with a detection timing of said fixed pattern of said header field, then temporarily closes the opened read gate with a completion timing of said data reproduced from said header field, opens the read gate again with said detection timing of said fixed pattern of said data field, and closes the read gate with said completion timing of said data reproduced from said data field.

3. An apparatus for reproducing digital data from a data recording medium having a sector format including a field in which a sector mark for indicating the head position of the sector, a fixed pattern for phase locking between a reproduced data and a sampling clock of said reproduced data and an address data of the sector are pre-formatted; followed by a data field including a fixed pattern for phase locking between said reproduced data and said sampling clock of said reproduced data wherein said data field is substantially comprised of a user data, said apparatus comprising:

phase locking means for performing phase locking between said reproduced data and said sampling clock of said reproduced data in a high-speed or low-speed mode; and read gate opening/closing means for opening/closing a read gate through which the reproduced data is outputted to said phase locking means;

retrial means for retrying the data reproduction from the same sector in the event that preceding reproduced data fails; and timing setting means for delaying timing with which said read gate opening/closing means opens the read gate every time a data reproduction is retried, wherein said read gate opening/closing means opens the read gate with a detection timing of said fixed pattern of said header field, then temporarily closes read gate with the completion timing of said data reproduced from said header field, opens again the read gate with a timing set by said timing setting means, and closes the read gate with the completion timing of the data reproduced from said data field.

4. An apparatus as recited in claim 3, further comprising a means for generating and transmitting a retry signal to said retrial means when said preceding data reproduction fails.

5. An apparatus as recited in claim 4, wherein said retrial means further comprises a means for selecting one of two read gate signals in response to said retry signal.

6. An apparatus as recited in claim 5, further comprising means for generating a data read control signal,
said timing setting means being responsive to said data read control signal so that said read gate opening/closing means opens the read gate and said data reproduction is retried.

7. An apparatus for reproducing digital data from a data recording medium having a sector format including: a field in which a sector mark for indicating the head position of the sector, a fixed pattern for phase locking between a reproduced data and a sampling clock of said reproduced data and an address data of the sector are pre-formatted; followed by a data field including a fixed pattern for phase locking between said reproduced data and said sampling clock of said reproduced data wherein said data field is substantially comprised of user data,
said apparatus comprising:
read gate opening and closing means for opening and closing a read gate through which said reproduced data is received;
phase locking means for performing phase locking between said reproduced data and said sampling clock of said reproduced data in one of a high-speed and low-speed mode, said phase locking means receiving said reproduced data from said read gate opening and closing means wherein, said phase locking means generating a reproduction clock and sync data;
means for generating a header/data gate signal and transmitting to said read gate opening and closing means to recognize said fixed pattern;
lock decision means for generating and transmitting a high/low speed control signal to said phase locking means;
address detection means for detecting said address data from said sync data and generating an address completion signal;
data demodulation means for demodulating said sync data and transmitting a data demodulation completion signal to said read gate opening and closing means; and
error correction means receiving said demodulated data from said data demodulated means, correcting the data with an error correction code and outputting the corrected reproduction data;
wherein said phase locking means includes means for phase locking said reproduced data from said header field in high-speed mode as determined by said lock decision means, and subsequently phase locking said reproduced data from said data field in said low-speed mode until completion of the phase locking of the reproduced data from said data field.

8. An apparatus as recited in claim 7, further comprising a microcomputer for generating a retry read control signal and transmitting it to said read gate opening and closing means;
wherein said microcomputer generates said retry read control signal upon receipt of an error correction nullified detection signal from said error correction means, indicating that said error correction means could not correct said demodulated data.

9. An apparatus as recited in claim 8, wherein said lock decision means further comprises a first circuit for determining lock completion when said digital data is detected sequentially and a second circuit for generating a false lock completion signal, said second circuit comprising a counter for counting the number of sampling clocks, said counter counting to a preset number of said sampling clocks when said phase locking means is unable to lock so that said lock decision means generates said high/low speed signal, and said error correction means detects an error in the demodulated data, corrects said demodulated data, and outputs said reproduction data.

10. An apparatus is recited in claim 7, wherein said lock decision means further comprises a counter for counting the number of sampling clocks, said counter counting to a preset number of sampling clocks when said phase locking means is unable to lock so that said lock decision means generates a high/low speed signal, and said signal error correction means detects an error in said demodulated data, corrects said demodulated data, and outputs said reproduction data.

11. An apparatus as recited in claim 10, further comprising a microcomputer for generating a counter set value control signal upon receipt of an error correction nullified detection signal from said error correction means, indicating that said error correction means could not correct said demodulated data, so that the preset value of the counter can be changed by said microcomputer.

12. An apparatus for reproducing digital data from a data recording medium having a sector format including: a field in which a sector mark for indicating the head position of the sector, a fixed pattern for phase locking between a reproduced data and a sampling clock of said reproduced data and an address data of the sector are pre-formatted; followed by a data field including a fixed pattern for phase locking between said reproduced data and said sampling clock of said reproduced data wherein said data field is substantially comprised of user data,
said apparatus comprising;
read gate opening and closing means for opening and closing a read gate through which said reproduced data is received;
phase locking means for performing phase locking between said reproduced data and said sampling clock of said reproduced data in one of a high-speed and low-speed mode, said phase locking means receiving said reproduced data from said read gate opening and closing means wherein, said phase locking means generating a reproduction clock and sync data;
means for generating a head/data gate signal and transmitting to said read gate opening and closing means to recognize said fixed pattern;
lock decision means for generating and transmitting a high/low speed control signal to said phase locking means;
address detection means for detecting said address data from said sync data and generating an address completion signal;
data demodulation means for demodulating said sync data and transmitting a data demodulation completion signal to said read gate opening and closing means; and
error correction means receiving said demodulated data from said data demodulation means, correcting the data with an error correction code and outputting the corrected reproduction data;
said read gate opening and closing means including:

means for opening said read gate with a detection timing of said fixed pattern of said header field;

means for closing said read gate with a completion timing of said data reproduced from said header field;

means for opening the read gate again with said detection timing of said fixed pattern of said data field; and means for closing said read gate with said completion timing of said data reproduced from said data field.

13. An apparatus for reproducing digital data from a data recording medium having a sector format including: a field in which a sector mark, for indicating the head position of the sector, a fixed pattern for phase locking between a reproduced data and a sampling clock of said reproduced data and an address data of the sector are pre-formatted; followed by a data field including a fixed pattern for phase locking between said reproduced data and said sampling clock of said reproduced data and a data area where a substantial data is recorded, said apparatus comprising:

read gate opening and closing means for opening and closing a read gate through which said reproduced data is received;

retrial means for retrying the data reproduction from a same sector when the reproduction of preceding reproduced data fails; and timing setting means for delaying the timing with which said read gate opening and closing means opens said read gate every time data reproduction is retried, wherein said read gate opening and closing means includes:

means for opening said read gate with the detection timing of said fixed pattern of said header field;

means for subsequently, temporarily closing said read gate with a completion timing of said data reproduced from said header field;

means for opening said read gate again with a timing set by said timing setting means; and means for closing the read gate with the completion timing of the data reproduced from said data field.

* * * * *